United States Patent
Takahashi et al.

(10) Patent No.: US 7,591,983 B2
(45) Date of Patent: Sep. 22, 2009

(54) HEAVY OIL TREATING METHOD AND HEAVY OIL TREATING SYSTEM

(75) Inventors: Hirokazu Takahashi, Hitachinaka (JP); Shinichi Inage, Hitachi (JP); Nobuyuki Hokari, Hitachinaka (JP); Masahiko Yamagishi, Hitachinaka (JP); Akinori Hayashi, Hitachinaka (JP); Osami Yokota, Hitachinaka (JP); Youji Ishibashi, Yuge (JP)

(73) Assignees: Hitachi, Ltd., Tokyo (JP); Petroleum Energy Center, Tokyo (JP)

( * ) Notice: Subject to any disclaimer, the term of this patent is extended or adjusted under 35 U.S.C. 154(b) by 334 days.

(21) Appl. No.: 10/910,579

(22) Filed: Aug. 4, 2004

(65) Prior Publication Data

US 2005/0040081 A1 Feb. 24, 2005

(30) Foreign Application Priority Data

Aug. 5, 2003 (JP) .............................. 2003-205953

(51) Int. Cl.
*B01J 8/04* (2006.01)
*C10G 31/08* (2006.01)
*C10G 17/02* (2006.01)

(52) U.S. Cl. ...................... 422/188; 422/105; 422/108; 422/110; 422/116; 422/255; 210/513; 210/519; 210/201; 210/205; 210/252; 261/75; 261/76; 261/115; 261/116; 261/117

(58) Field of Classification Search ................. 208/242, 208/130, 125, 128, 407, 409; 422/105, 108, 422/110, 116, 255, 188; 261/75, 76, 94, 261/97, 98, 115, 116, 117; 210/513, 519

See application file for complete search history.

(56) References Cited

U.S. PATENT DOCUMENTS

| 3,586,621 A | * | 6/1971 | Pitchford et al. | ............ 208/112 |
| 3,708,569 A | * | 1/1973 | Mounce | ................... 423/574.1 |
| 3,792,571 A | * | 2/1974 | Waki et al. | ..................... 95/128 |
| 3,960,706 A | * | 6/1976 | McCollum et al. | .......... 208/112 |
| 3,960,708 A | * | 6/1976 | McCollum et al. | .......... 208/121 |
| 3,983,027 A | * | 9/1976 | McCollum et al. | .......... 208/435 |
| 3,988,238 A | * | 10/1976 | McCollum et al. | .......... 208/435 |
| 3,989,618 A | * | 11/1976 | McCollum et al. | .......... 208/106 |
| 4,446,012 A | * | 5/1984 | Murthy et al. | .............. 208/130 |

(Continued)

FOREIGN PATENT DOCUMENTS

GB 2091758 A 8/1982

(Continued)

*Primary Examiner*—Walter D Griffin
*Assistant Examiner*—Huy-Tram Nguyen
(74) *Attorney, Agent, or Firm*—Mattingly & Malur, P.C.

(57) ABSTRACT

The invention is intended to produce high-pressure light fuel gas with good combustibility by contacting and reacting high-temperature, high-pressure water and heavy oil with each other in a contact-reaction unit to extract light oil components from the heavy oil and to remove metals. The high-temperature, high-pressure water and the heavy oil are introduced to the contact-reaction unit for contact and reaction with each other therein. Heavy oil components not dissolved in the high-temperature, high-pressure water are separated by precipitation from hydrocarbon gases and light oil components which are dissolved in the high-temperature, high-pressure water. The separated heavy oil components are burnt or incinerated without any further modification.

3 Claims, 5 Drawing Sheets

U.S. PATENT DOCUMENTS

| | | | |
|---|---|---|---|
| 4,543,177 A * | 9/1985 | Murthy et al. | 208/130 |
| 4,743,357 A * | 5/1988 | Patel et al. | 208/113 |
| 4,824,570 A * | 4/1989 | Bethuel et al. | 210/511 |
| 5,571,424 A * | 11/1996 | Ahluwalia | 210/761 |
| 5,578,647 A * | 11/1996 | Li et al. | 518/700 |
| 6,325,921 B1 | 12/2001 | Andersen | |
| 6,504,068 B1 * | 1/2003 | Matsubara et al. | 585/240 |
| 6,821,413 B1 * | 11/2004 | Alkhaldi | 208/339 |
| 6,887,369 B2 * | 5/2005 | Moulton et al. | 208/107 |
| 7,144,498 B2 * | 12/2006 | McCall et al. | 208/113 |
| 7,264,710 B2 * | 9/2007 | Hokari et al. | 208/251 R |
| 2003/0062163 A1 * | 4/2003 | Moulton et al. | 166/302 |
| 2003/0168381 A1 * | 9/2003 | Hokari et al. | 208/106 |
| 2004/0232046 A1 * | 11/2004 | Tanaka et al. | 208/107 |
| 2005/0072137 A1 * | 4/2005 | Hokari et al. | 60/39.461 |
| 2006/0011511 A1 * | 1/2006 | Hokari et al. | 208/106 |

FOREIGN PATENT DOCUMENTS

| | | |
|---|---|---|
| JP | 6-279763 | 10/1994 |
| JP | 11-080750 | 3/1999 |
| JP | 2000-109850 | 4/2000 |
| JP | 2002-294257 | 10/2002 |
| JP | 2002-338973 | 11/2002 |
| JP | 2002-361068 | 12/2002 |
| JP | 2003-049180 | 2/2003 |
| JP | 2003-49180 | 2/2003 |

* cited by examiner

HEAVY OIL TREATING METHOD AND HEAVY OIL TREATING SYSTEM

BACKGROUND OF THE INVENTION

1. Field of the Invention

The present invention relates to a heavy oil treating method and a heavy oil treating system. More particularly, the present invention relates to a method of contacting heavy oil with high-temperature, high-pressure water to remove metal components in the heavy oil, thereby obtaining light oil containing hydrocarbon gases, which is suitable as fuel for use in gas turbines, etc.

2. Description of the Related Art

In view of that heavy oil containing a large amount of heavy metals is not suitable as fuel for generation of electric power by gas turbines, methods of removing those heavy metals for conversion into a useful energy source are proposed in Patent Reference 1 (JP,A 2000-109850, Abstract) and Patent Reference 2 (JP,A 2003-49180, Abstract).

Patent Reference 1 discloses a method of contacting high-temperature, high-pressure water (supercritical water), an alkali and heavy oil with one another in a supercritical state (critical point of water: 374° C. and 22.1 MPa) to decompose the heavy oil, thereby producing light oil components, hydrocarbon gases, metal oxides, an alkaline salt, and supercritical water. The obtained decomposition product is separated by an extractor into the hydrocarbon gases, the light oil components, and water. By repeating those steps of modification and separation, metal components and sulfur in the heavy oil are removed and light oil is produced. The basis of that disclosed technique resides in reacting the heavy oil with the supercritical water under the presence of an alkali for conversion into the light oil.

However, adding an alkaline metal and others, as a modifying catalyst, in heavy oil is disadvantageous in that, when produced light oil is used as fuel for gas turbines, corrosion of gas turbine parts is caused unless the added alkaline metal and others are removed.

Patent Reference 2 discloses a method of contacting supercritical water and heavy oil with each other to dissolve light oil components in the supercritical water for separation into the light oil components and heavy oil components, and further contacting the remaining heavy oil components with the supercritical water for modification of the heavy oil components. The finally left residue is incinerated. To promote decomposition of the residue, Patent Reference 2 also discloses addition of an alkaline metal as a catalyst.

In any of the above-cited Patent References, the heavy oil components which have not dissolved in the supercritical water are further reformed, and an alkaline catalyst is added to decompose and modify those heavy oil components which are hard to modify. It is therefore problematic to employ the reformed light oil components, as they are, as fuel for gas turbines. Further, repeating the modifying step increases the fuel cost.

SUMMARY OF THE INVENTION

It is an object of the present invention to eliminate the need of using a catalyst, such as an alkali, when modifying heavy oil with high-temperature, high-pressure water, to remove heavy metals from the heavy oil, and to produce fuel for gas turbines.

The present invention is featured in contacting high-temperature, high-pressure water and heavy oil with each other, and after the lapse of a predetermined contact time, separating light oil components dissolved in the high-temperature, high-pressure water and heavy oil components containing metals from each other by precipitation.

DESCRIPTION OF THE PREFERRED EMBODIMENTS

The present invention provides a heavy oil treating method comprising the steps of contacting high-temperature, high-pressure water and heavy oil with each other; after the lapse of a predetermined contact time, separating heavy oil components not dissolved in the high-temperature, high-pressure water from light oil components dissolved in the high-temperature, high-pressure water; and directly burning or incinerating the separated heavy oil components. The high-temperature, high-pressure water is supercritical water or sub-critical water.

Contact conditions (such as temperature, pressure and time) between the heavy oil and the supercritical water are selected so that the heavy oil components not dissolved in the high-temperature, high-pressure water contain metal compounds at relatively higher concentrations than those in the light oil components dissolved in the high-temperature, high-pressure water.

In the present invention, the heavy oil components not dissolved in the high-temperature, high-pressure water are separated from the light oil components dissolved in the high-temperature, high-pressure water by employing a precipitation process (by utilizing their own weight, i.e., gravity). This process for separating the heavy oil components is therefore most rational and cost effective, and requires less energy consumption.

Upon contact of the supercritical water and the heavy oil, parts of the light oil components and the heavy oil components react with the supercritical water, thus causing the so-called modification described in the above-cited Patent References 1 and 2. The present invention also accompanies such a phenomenon, but the treatment method of the present invention is essentially intended to dissolve hydrocarbon gases and the light oil components in the supercritical water, to separate the heavy oil components not dissolved in the supercritical water by precipitation, and to burn or incinerate the separated heavy oil components without any further modification. The contact conditions between the supercritical water and the heavy oil are selected so that the components not dissolved in the supercritical water is not more than 10 weight % of the loaded heavy oil. In particular, the contact conditions are preferably adjusted so that the non-dissolved heavy oil components are not more than 5 weight % of the loaded heavy oil.

In the present invention, the heavy oil components not dissolved in the high-temperature, high-pressure water are separated by precipitation to remove metals in the heavy oil. Stated another way, only gravity is utilized to precipitate the heavy oil components for separation, and the separated heavy oil components containing a large amount of heavy metals and sulfur are burnt or incinerated without any further modification. As a result, fuel for gas turbines, etc. can be easily and inexpensively obtained. In addition, since the heavy oil components containing heavy metals are disposed of by burning them, harmful components for gas turbine parts such as an alkali are positively prevented from being mixed in fuel and the total cost can be held at a lower level.

Figure 1:
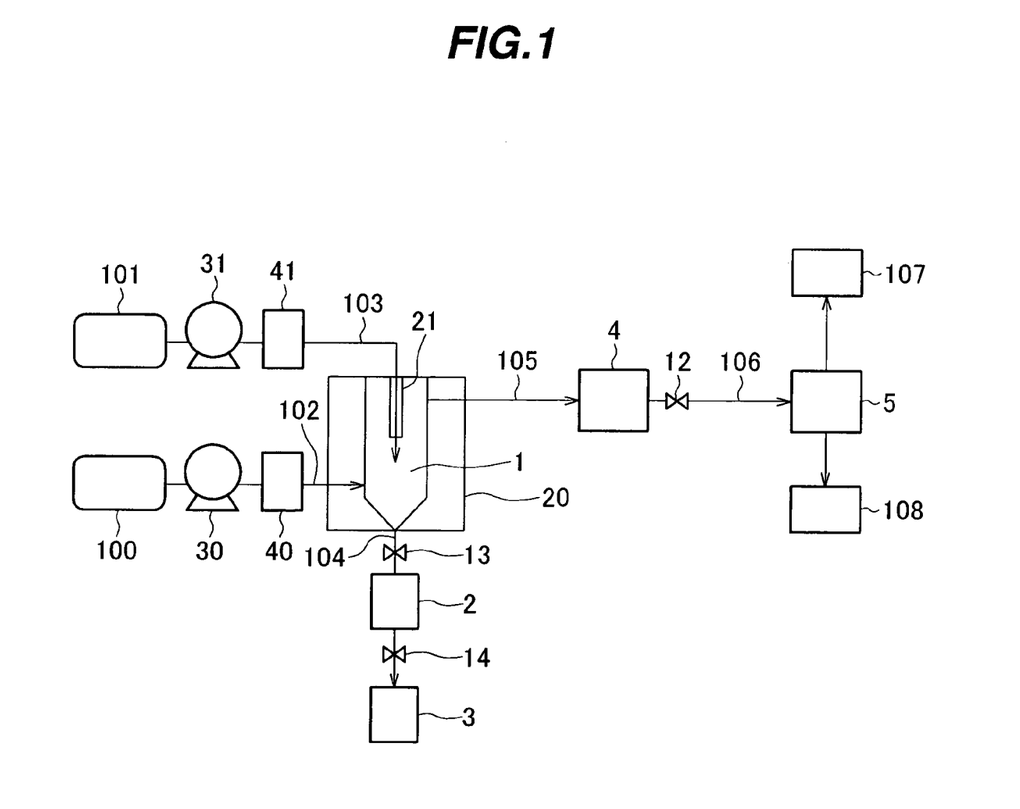
FIG. 1 is a block diagram showing the construction of a heavy oil treating system according to one embodiment of the present invention.
Figure 3:
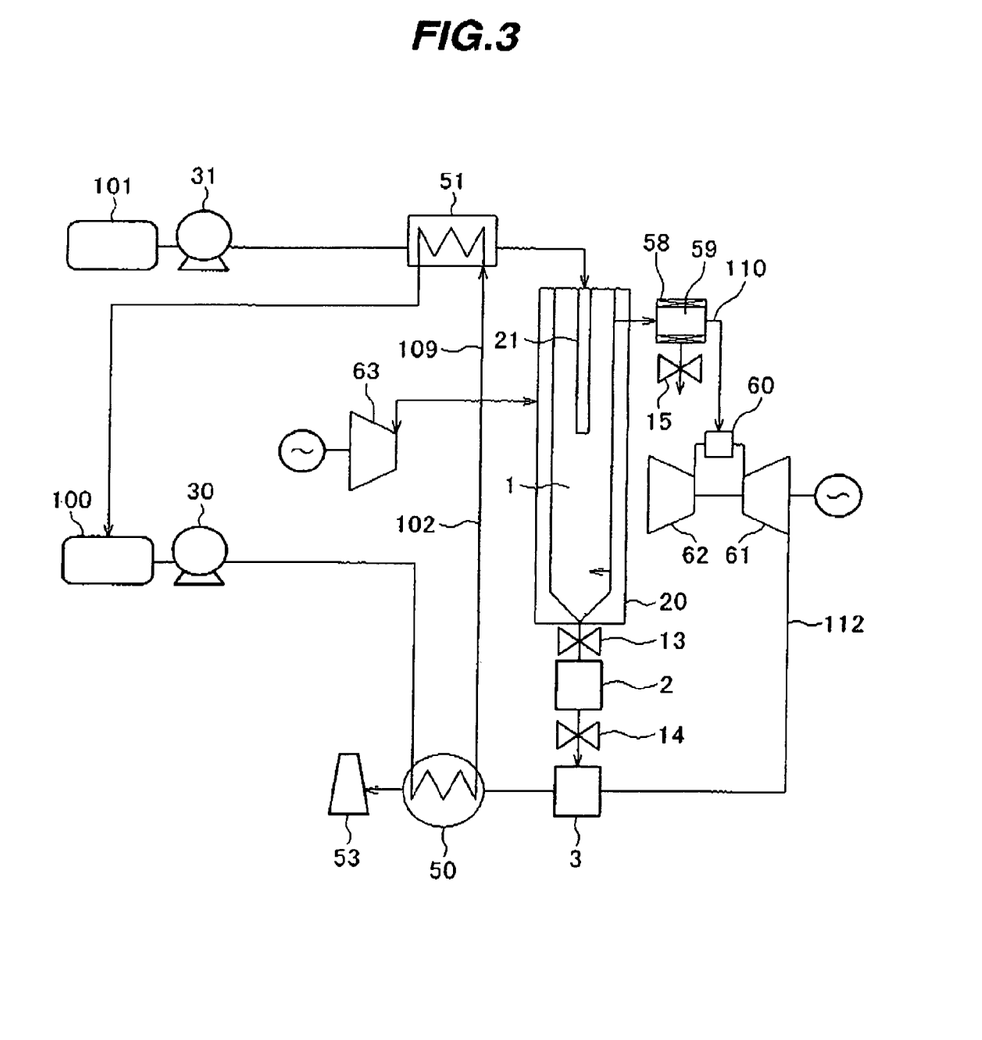
FIG. 3 is a block diagram showing the construction of a heavy oil treating system according to an other embodiment of the present invention.
Figure 4:
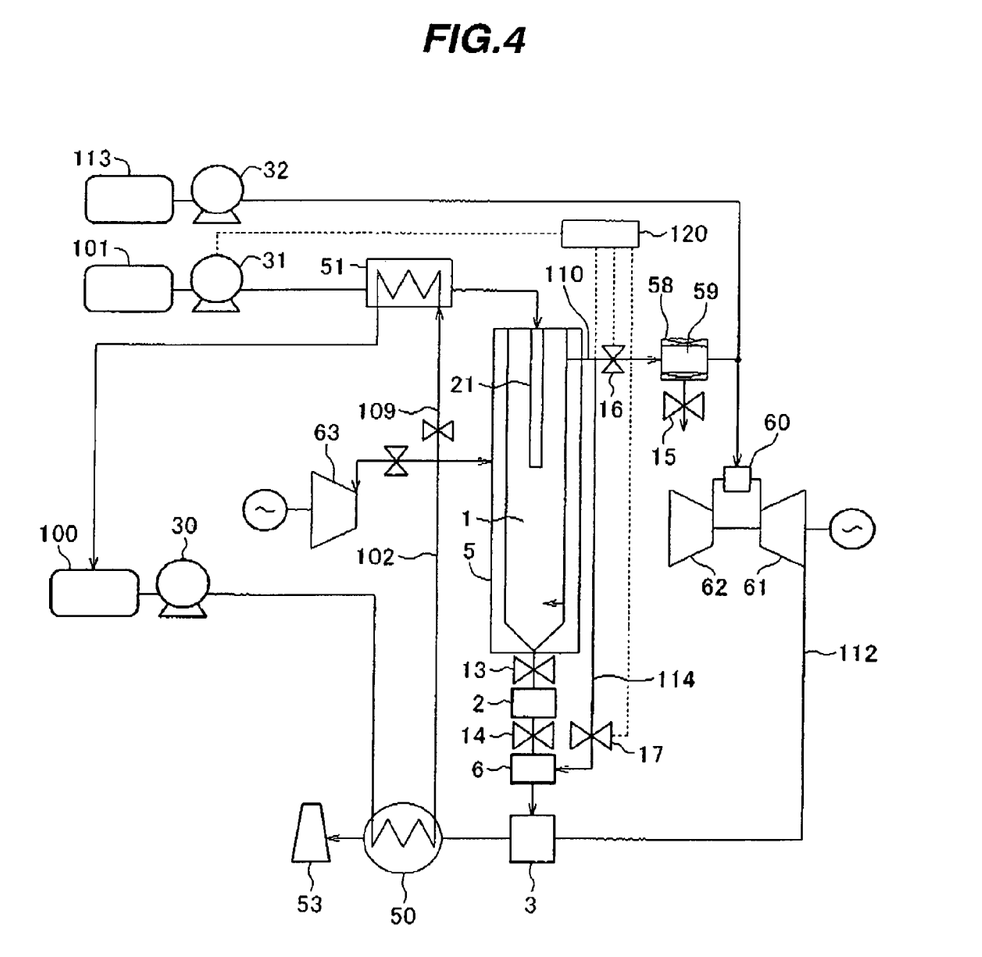
FIG. 4 is a block diagram showing the construction of a heavy oil treating system according to an other embodiment of the present invention.

The process of separating the heavy oil components and the light oil components from each other in the present invention can be performed as shown in FIGS. 1, 3 and 4. Heavy oil is supplied vertically downward into a contact-reaction unit 1 through a nozzle 21, and high-temperature, high-pressure water alone or high-temperature, high-pressure water mixed with an oxidant is supplied so as to contact with the heavy oil. Light oil components dissolved in the supercritical water are taken out from the contact-reaction unit 1 together with the supercritical water through a reformed oil extraction pipe 105 that is provided separately from a means for supplying the heavy oil.

Indissoluble hydrocarbons having large molecular weight are compounds containing metals, such as vanadium porphyrin. The heavy oil components containing enriched metals are in phase of a liquid having fluidity at high temperatures, and hence they can be easily extracted from a high-pressure container. Further, since no coke is generated under the above-described contact conditions in the present invention, the step of cleaning coke is not required.

More concretely, the reaction process is carried out as follows. The contact-reaction unit 1 is installed with the flow direction set to extend vertically, and the heavy oil is supplied downward vertically from the top of the contact-reaction unit 1 to react with the high-temperature, high-pressure water supplied from a side of the contact-reaction unit in its lower portion. Hydrocarbon gases and light oil components both produced by the reaction are dissolved in the high-temperature, high-pressure water and then caused to flow out of an upper portion of the contact-reaction unit 1. Heavy oil components having large specific gravity and precipitated through the contact and reaction steps are accumulated in a bottom portion of the contact-reaction unit 1. A means for extracting the heavy oil components, such as a lock hopper, is disposed at the bottom of the contact-reaction unit 1 to extract the heavy oil components from the contact-reaction unit.

To accelerate the decomposing reaction of the heavy oil in the contact and reaction steps, an oxidant may be added to the high-temperature, high-pressure water. Also, because an optimum temperature, pressure and steam partial pressure in the reaction and separation steps differ depending on kinds of heavy oil (such as A-grade heavy oil, B-grade heavy oil, C-grade heavy oil, depressurized residual oil, olimulsion, oil sand, oil shell, and waste oil), the optimum temperature, pressure and steam partial pressure are not limited to particular values. It is essential that hydrocarbon gases and light oil components are produced by causing heavy oil to contact and react with high-temperature, high-pressure water, and that heavy oil components not dissolved in the high-temperature, high-pressure water are produced in small amount and metals contained in the heavy oil are enriched in the heavy oil components.

According to the present invention, in a method of removing metals in heavy oil with a contact-reaction unit in which high-temperature, high-pressure water and the heavy oil are contacted and reacted with each other to decompose the heavy oil, thereby producing hydrocarbon gases, light oil components and heavy oil components, for the purpose of efficiently removing, from the heavy oil, the metals contained in the heavy oil, the hydrocarbon gases and the light oil components among those three components produced with the contact-reaction unit are dissolved in the high-temperature, high-pressure water to obtain reformed oil. Preferably, the heavy oil components comprising indissoluble hydrocarbons having large molecular weight are separated and burnt or incinerated as they are.

By enriching, in the heavy oil components, metal compounds, such as vanadium porphyrin, contained in the heavy oil, the components usable as fuel for gas turbines can be separated. Further, since the heavy oil components containing enriched metals are in phase of a liquid having fluidity at high temperatures, they can be easily extracted from a high-pressure container and the step of cleaning coke is not required.

More concretely, the reaction process is carried out in the contact-reaction unit as follows. The contact-reaction unit is installed with the flow direction set to extend vertically, and the heavy oil is supplied downward vertically from the top of the contact-reaction unit to react with the high-temperature, high-pressure water supplied from a side of the contact-reaction unit in its lower portion. Hydrocarbon gases and light oil components both produced by the reaction are dissolved in the high-temperature, high-pressure water and then caused to flow out of an upper portion of the contact-reaction unit. Heavy oil components produced by the reaction and having large specific gravity are accumulated in a bottom portion of the contact-reaction unit. A means for extracting the heavy oil components, such as a lock hopper, is disposed at the bottom of the contact-reaction unit to extract the heavy oil components from the contact-reaction unit.

In the contact and reaction unit, to accelerate the decomposing reaction of the heavy oil, an oxidant may be added, or a decomposing catalyst or the like may be filled. Also, because an optimum temperature, pressure and steam partial pressure in the reaction-separation unit and the separation step differ depending on kinds of heavy oil (such as A-grade heavy oil, B-grade heavy oil, C-grade heavy oil, depressurized residual oil, olimulsion, oil sand, oil shell, and waste oil), the optimum temperature, pressure and steam partial pressure are not limited to particular values.

It is essential that hydrocarbon gases and light oil components are produced by causing heavy oil to contact and react with high-temperature, high-pressure water, and that heavy oil components not dissolved in the high-temperature, high-pressure water are produced in small amount and metals contained in the heavy oil are enriched in the heavy oil components.

Further, the present invention provides a heavy oil treating system comprising a nozzle for supplying heavy oil downward; a structure for supplying high-temperature, high-pressure water alone or high-temperature, high-pressure water mixed with an oxidant at a level lower than the nozzle; and a contact-reaction unit including a structure provided in an upper portion thereof for taking out light oil at a position away from the nozzle through which the heavy oil is supplied.

Still further, the present invention provides a heavy oil treating system comprising a contact-reaction unit for contacting high-temperature, high-pressure water and heavy oil with each other and separating the heavy oil into heavy oil components and light oil components by precipitation; a means for discharging the heavy oil components containing metals and precipitated in a bottom portion of the contact-reaction unit without dissolving in the high-temperature, high-pressure water; and a means for burning the heavy oil components extracted through the discharging structure.

Embodiments of the present invention will be described below with reference to the accompanying drawings.

First Embodiment

FIG. 1 shows a heavy oil treating system for treating heavy oil with high-temperature, high-pressure water, removing, from the heavy oil, metals contained in the heavy oil, such as vanadium, according to a first embodiment of the present invention.

In this system, water from supply 100 is pressurized to 20 MPa by a water supply pump 30 for supplying the water under pressure, and is then heated up to 480° C. by a water preheater 40, thereby producing high-temperature, high-pressure water 102. Similarly, heavy oil from supply 101 is pressurized to 20 MPa by a heavy oil supply pump 31 for supplying the heavy oil under pressure, and is then heated up to 350° C. by an oil preheater 41, thereby producing high-temperature, high-pressure heavy oil 103. While electric heaters are employed as the water preheater 40 and the oil preheater 41, the water and the heavy oil may be heated by heat exchangers using high-temperature steam.

A contact-reaction unit 1 is installed such that the high-temperature, high-pressure water and the high-temperature, high-pressure heavy oil flow parallel to the vertical direction. The contact-reaction unit 1 is heated up to 450° C. externally by a heater 20. The high-temperature, high-pressure water is supplied to a lower portion of the contact-reaction unit 1 through a high-temperature, high-pressure water supply pipe 102. The high-temperature, high-pressure heavy oil is supplied to the contact-reaction unit 1 through a high-temperature, high-pressure heavy oil pipe 103 and a nozzle 21, which is disposed at the top of the contact-reaction unit 1, for mixing and reaction with the high-temperature, high-pressure water. Additionally, the contact-reaction unit 1 may be provided with a line system for supplying an oxidant or any other suitable additive to it. As an alternative, a line system for supplying an oxidant or any other suitable additive together with the high-temperature, high-pressure water may be disposed. In those cases, however, an alkaline catalyst unsuitable as an additive for gas turbine fuel should not be added.

Because an oxidant reacts with the high-temperature, high-pressure heavy oil in the contact-reaction unit 1 and generates heat, the output power of the heater 20 can be reduced by supplying the oxidant. To avoid an excessive rise of the temperature of the contact-reaction unit 1, the amount of the supplied oxidant is set to be in the range of 2 to 4 weight % with respect to the amount of the supplied water.

In the contact-reaction unit 1, the high-temperature, high-pressure heavy oil reacts with the high-temperature, high-pressure water and is reformed so as to produce hydrocarbon gases, light oil components comprising light oil, and heavy oil components having large molecular weight. The hydrocarbon gases and the light oil components are dissolved and mixed in the high-temperature, high-pressure water to become reformed oil that is taken out from an upper portion of the contact-reaction unit 1 through a reformed oil extraction pipe 105. The heavy oil components are neither dissolved nor mixed in the high-temperature, high-pressure water and are precipitated in a bottom portion of the contact-reaction unit 1. Metals contained in the heavy oil are enriched in the heavy oil components and removed from the reformed oil. The reformed oil from which the metals have been removed is cooled by a cooler 4, depressurized by a pressure reducing valve 12, and then supplied to a gas-liquid separator 5 through a reformed oil extraction pipe 106 for separation into the hydrocarbon gases and a mixture of light oil and water. The hydrocarbon gases and the mixture are sent respectively to a hydrocarbon gas tank 107 and a light-oil and water mixture tank 108.

While this embodiment employs a system for supplying the reformed oil to the gas-liquid separator 5 to recover the hydrocarbon gases and the light oil components, the system may be changed such that the hydrocarbon gases and the mixture of light oil and water are supplied in the mixed state to a gas turbine or a boiler to be utilized for generation of electric power or as motive power. Also, the system may be changed such that the reformed oil is supplied to an engine, or that the heavy oil is cooled and depressurized to obtain a product transportable to the site of fuel consumption. Further, the mixture of light oil and water may be separated into the light oil and the water by a centrifugal separator for supply of only the light oil to a gas turbine or a boiler.

The heavy oil components separated from the reformed oil in the contact-reaction unit 1 are discharged to the exterior of the system through a lock hopper 2. At that time of discharging, in this embodiment, a heavy-oil-component extraction valve 14 disposed downstream of the contact-reaction unit 1 is closed and an outlet valve 13 of the contact-reaction unit 1 is opened, thus allowing the heavy oil components to be extracted to the lock hopper 2. After the pressure in the lock hopper 2 has reached the same level as that in the contact-reaction unit 1, the outlet valve 13 of the contact-reaction unit 1 is closed and the heavy-oil-component extraction valve 14, as one example of discharging means, is opened to extract the heavy oil components to the exterior of the system through a heavy-oil-component extraction pipe 104.

Further, this embodiment employs a system for burning the heavy oil components extracted from the lock hopper 2 in a flare stack 3. However, the system may be changed such that the heavy oil components are supplied to a boiler through the heavy-oil-component extraction pipe 104 and burnt in the boiler to generate steam for driving a steam turbine for generation of electric power or for utilization as motive power. Also, the heavy oil components may be burnt to produce high-temperature, high-pressure water or oil to be utilized as a heat source for the water preheater 40 and/or the oil preheater 41 in the system of this embodiment.

Results of a test example of removing metals from heavy oil by using the actual system of this embodiment are as follows. This test example was conducted as a test of removing vanadium in heavy oil. An initial vanadium concentration in the heavy oil was 4.0 ppm (weight). The heavy oil was heated up to 80° C. in a tank and then supplied to the contact-reaction unit 1 by a pump at a rate of 8.0 g/minute while being heated up to 350° C. by the external heater 20. Water was fed by a water pump at a rate of 4.0 g/minute while being heated up to 480° C. by the external heater 20, for supply as high-temperature, high-pressure water to the contact-reaction unit 1. The contact-reaction unit 1 was in the form of a straight pipe with a length of 1 m. A fore end of the nozzle 21 was positioned at a level spaced 0.2 m from the top of the contact-reaction unit 1 and was held at a temperature of 450° C. and a pressure of 20 MPa. The heavy oil was treated with the high-temperature, high-pressure water at a spatial speed of $1.9\ h^{-1}$ on the liquid basis, whereby the reformed oil and the heavy oil components were produced.

The heavy oil components produced in the contact-reaction unit 1 were precipitated in the bottom portion of the contact-reaction unit 1, and 89.3 weight % of heavy metals were contained in the heavy oil components. The reformed oil produced through the above-described process was cooled by the cooler 4 and depressurized by the pressure reducing valve 12. Thereafter, the reformed oil was sampled for analysis of compositions thereof. Gaseous substances at room temperature were $H_2$, CO, $CO_2$, and hydrocarbons of $C_1$-$C_5$, and light oil was hydrocarbons having carbon numbers of $C_6$ or more. The vanadium concentration in the light oil was 0.5 ppm, and the calorific value of the light oil was 10,500 kcal/kg.

Figure 2:
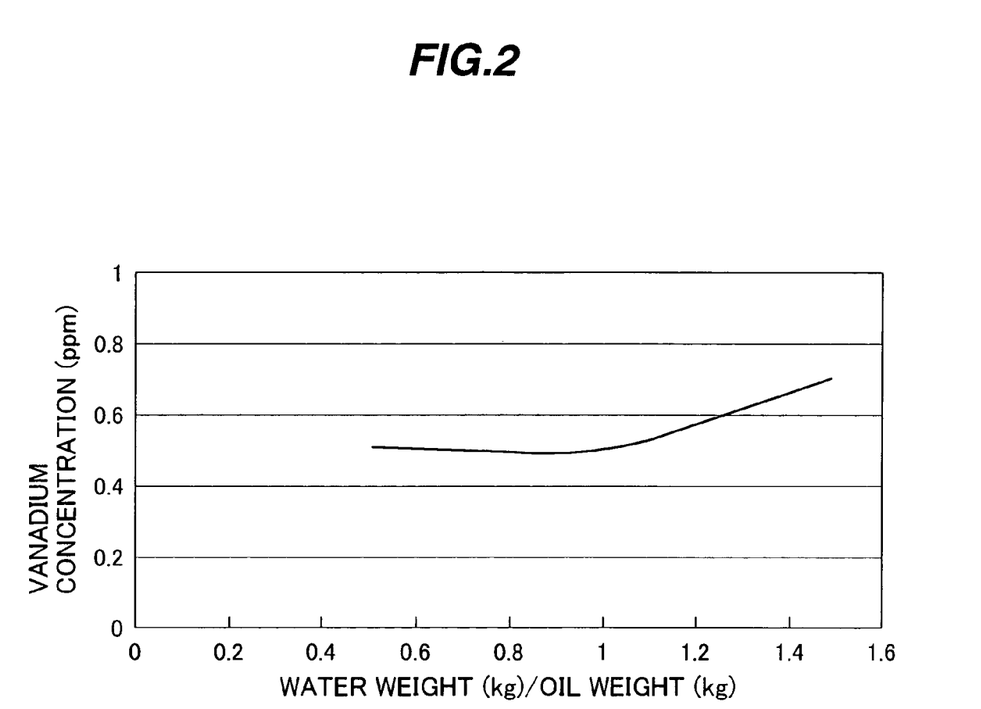
FIG. 2 is a graph showing an influence of vanadium concentration in light oil with respect to change in ratio of oil weight to water weight in the first embodiment.

Further, when a ratio of the amount of high-temperature, high-pressure water to the amount of heavy oil was changed in the range of 0.5 to 1.5 while keeping the spatial speed on the liquid basis the same, the vanadium concentration in the light oil was in the range of 0.5 to 0.7 ppm as shown in FIG. 2. The compositions and vanadium balance in the reformed fuel were listed in Table 1 given below. As seen from Table 1, 8.5 weight % of the heavy oil was occupied by the heavy oil components not dissolved in the high-temperature, high-pressure water, and 89.3 weight % of vanadium was captured in the heavy oil components. Thus, the reformed oil having a low heavy metal concentration was produced. As will be understood from those test results, this embodiment of the present invention has succeeded in efficiently and easily removing metals contained in heavy oil and in obtaining desired reformed oil.

TABLE 1

|  | Weight proportion (weight %) | Vanadium concentration (ppm) | Vanadium proportion (weight %) |
| --- | --- | --- | --- |
| Heavy oil (start material) | 100 | 4 | 100.0 |
| Soft gases | 8.1 | 0.0 | 0.0 |
| Reformed oil | 83.4 | 0.5 | 10.7 |
| Heavy oil components | 8.5 | 42 | 89.3 |

Second Embodiment

This second embodiment represents a system for effectively utilizing waste heat of a gas turbine by supplying reformed oil, which is obtained by modifying heavy oil with high-temperature, high-pressure water, to a gas turbine combustor to generate electric power by the gas turbine, and by utilizing waste heat of combustion exhaust gas to produce the high-temperature, high-pressure water. The system of this embodiment will be described below with reference to FIG. 3.

In this system, water from supply 100 is pressurized to 20 MPa by a water supply pump 30 for supplying the water under pressure, and is then heated up to temperature of 450-480° C. by a water heat exchanger 50, thereby producing high-temperature, high-pressure water. Similarly, heavy oil from supply 101 is pressurized to 20 MPa by a heavy oil supply pump 31 for supplying the heavy oil under pressure, while steam extracted from the high-temperature, high-pressure water in a high-temperature, high-pressure water tank is supplied to an oil preheater 51 through an extracted steam pipe 109, thereby heating the heavy oil up to 350° C. to produce high-temperature, high-pressure heavy oil. Additionally, a part of the high-temperature, high-pressure water may be supplied to a steam turbine 63 to drive it for generation of electric power.

As in the first embodiment, a contact-reaction unit 1 is installed such that the high-temperature, high-pressure water and the high-temperature, high-pressure heavy oil flow parallel to the vertical direction. As a means for heating the contact-reaction unit 1, a contact-reaction unit heater 20 is disposed outside the contact-reaction unit 1. The contact-reaction unit heater 20 is in the form of a container holding the high-temperature, high-pressure water therein, and it externally heats the contact-reaction unit 1 up to about 450° C. with supply of the high-temperature, high-pressure water thereto.

Also, as in the first embodiment, the high-temperature, high-pressure water is supplied to a lower portion of the contact-reaction unit 1, and the high-temperature, high-pressure heavy oil is supplied to the contact-reaction unit 1 through a nozzle 21, which is disposed at the top of the contact-reaction unit 1, for mixing and reaction with the high-temperature, high-pressure water. Additionally, the contact-reaction unit 1 may be provided with a line system for supplying an oxidant or any other suitable additive to it. Further, a line system for supplying an oxidant or any other suitable additive together with the high-temperature, high-pressure water may be disposed as described above in connection with the first embodiment.

In the contact-reaction unit 1, the high-temperature, high-pressure heavy oil reacts with the high-temperature, high-pressure water and is reformed so as to produce hydrocarbon gases, light oil components, and heavy oil components having large molecular weight. The hydrocarbon gases and the light oil components are dissolved and mixed in the high-temperature, high-pressure water to become reformed oil that is taken out from an upper portion of the contact-reaction unit 1.

The heavy oil components are neither dissolved nor mixed in the high-temperature, high-pressure water and are precipitated in a bottom portion of the contact-reaction unit 1. Metals contained in the heavy oil are removed from the enriched oil in the reformed oil extraction pipe 105. The reformed oil from which the metals have been removed is depressurized in a pressure reducing step 59, and then supplied to a gas turbine combustor 60 in which the reformed oil is used as gas turbine fuel. In the pressure reducing step 59, the reformed oil is depressurized by using a fixed orifice or a flow adjusting valve. When the reformed oil is depressurized in the pressure reducing step 59, the temperature of the reformed oil falls due to adiabatic expansion. In view of such a temperature fall, the reformed oil is heated externally by a pressure-reducing step heater 58 to prevent condensation of the reformed oil. If a part of the reformed oil is condensed, it can be extracted to the exterior by opening a drain valve 15.

The gas turbine fuel is supplied to the gas turbine combustor 60 through a gas-turbine fuel supply pipe 110. The supplied fuel is mixed and burnt with air compressed by a compressor 62 to produce high-temperature combustion gas, thereby driving a gas turbine 61.

On the other hand, the heavy oil components separated from the reformed oil in the contact-reaction unit 1 are discharged to the exterior of the system through a lock hopper 2. At that time, in this embodiment, the heavy oil components are extracted from the lock hopper 2 and burnt in a flare stack 3 in a similar manner to that in the first embodiment, thereby further heating the combustion exhaust gas. The temperature of the combustion exhaust gas after driving the gas turbine 61 is not higher than 500° C., but it can be further raised by heat generated upon combustion of the heavy oil components in the flare stack 3.

The higher temperature of the combustion exhaust gas reduces a contact area required to produce the high-temperature, high-pressure water between the high-temperature, high-pressure water supply pipe 102 through which the high-temperature, high-pressure water flows and the combustion exhaust gas supplied to the water heat exchanger 50 through a combustion exhaust gas pipe 112. Therefore, the size of the water heat exchanger 50 can be reduced. After the temperature of the combustion exhaust gas has lowered to about 160° C. through the heat exchange with respect to the water, the combustion exhaust gas is discharged to the atmosphere through a stack 53.

Since the heat of the combustion exhaust gas is recovered with water and the recovered heat is supplied to the contact-reaction unit 1 and then to the gas turbine combustor 60 together with the reformed oil, the thermal input of the gas turbine 61 is increased and so is the output power thereof. According to this second embodiment, it is possible to produce the high-temperature, high-pressure water by utilizing waste heat of the combustion exhaust gas and to effectively utilize waste heat of a gas turbine.

Third Embodiment

This third embodiment represents a control method for a system wherein reformed oil, which is obtained by reforming heavy oil with high-temperature, high-pressure water, is supplied to a gas turbine combustor to generate electric power by a gas turbine. The system and the control method will be described below with reference to FIG. 4. The system of this embodiment includes a gas oil tank 113 and a gas oil pump 32 for supplying gas oil to the combustor. The gas oil is burnt in the gas turbine combustor at startup of the gas turbine, and a water heat exchanger 50 is heated by combustion exhaust gas produced after driving the gas turbine.

In this system, as in the second embodiment, water from supply 100 is pressurized to 20 MPa by a water supply pump 30 for supplying the water under pressure, and is then supplied to the water heat exchanger 50. The pressurized water is heated up to temperature of 450-480° C. by the water heat exchanger 50, thereby producing high-temperature, high-pressure water. Similarly, heavy oil from supply 101 is pressurized to 20 MPa by a heavy oil supply pump 31 for supplying the heavy oil under pressure, while steam extracted from the high-temperature, high-pressure water is supplied to an oil preheater 51, thereby heating the heavy oil up to 350° C. to produce high-temperature, high-pressure heavy oil.

A contact-reaction unit 1 is installed such that the high-temperature, high-pressure water and the high-temperature, high-pressure heavy oil flow parallel to the vertical direction. The high-temperature, high-pressure water is supplied to a lower portion of the contact-reaction unit 1, and the high-temperature, high-pressure heavy oil is supplied to the contact-reaction unit 1 through a nozzle 21, which is disposed at the top of the contact-reaction unit 1, for mixing and reaction with the high-temperature, high-pressure water. Also, as in the second embodiment, the high-temperature, high-pressure water is used as means for heating the contact-reaction unit 1.

At startup of the operation, the high-temperature, high-pressure water is supplied to the contact-reaction unit 1 for preheating it up to 450° C. After measuring the temperature of gas turbine fuel and confirming that the fuel temperature has risen up to 450° C., a controller 120 instructs the heavy oil supply pump 31 to start rotation for supply of the heavy oil. At this time, a reformed oil stop valve 16 is closed and the opening degree of an oil tank inlet valve 17 is adjusted such that the pressure in the contact-reaction unit 1 is held at 20 MPa. Then, initial reformed fuel is sent to a flare stack 3 for burning through an initial reformed fuel supply pipe 114. Alternatively, the initial reformed fuel may be burnt in the flare stack 3 after being temporarily stored in an oil tank 6.

The temperature of the contact-reaction unit 1 lowers upon supply of the heavy oil. When the system returns to a steady state thereafter, the temperature of the gas turbine fuel rises again to 400-450° C. Upon detecting that the temperature of the gas turbine fuel has risen up to 400° C. or higher, the controller 120 instructs the reformed oil stop valve 16 to open and the oil tank inlet valve 17 to close.

Figure 5:
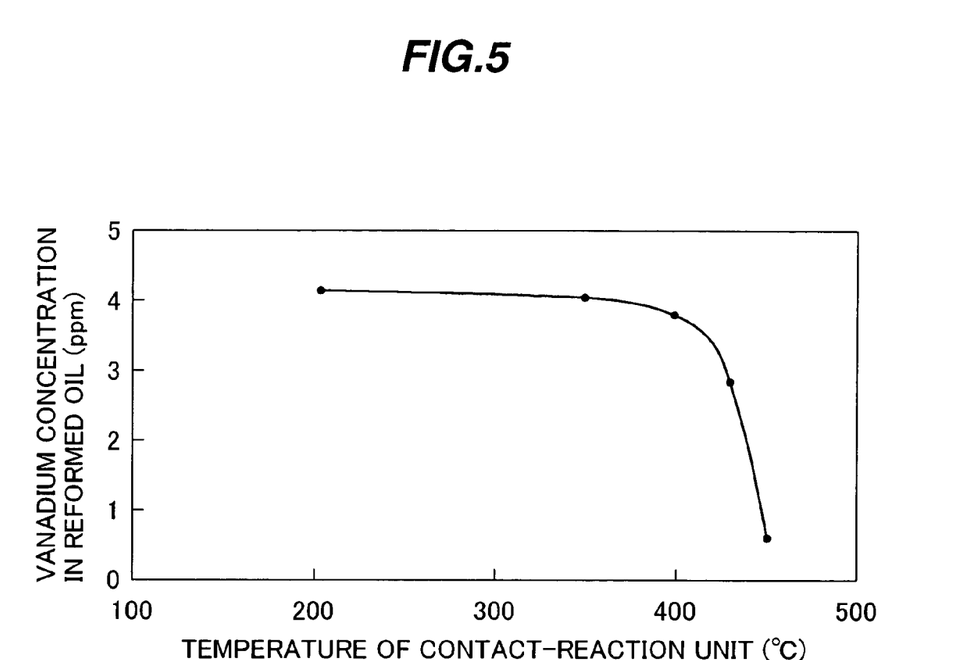
FIG. 5 is a graph showing the relationship between vanadium concentration in gas turbine fuel and temperature of a contact-reaction unit in the third embodiment.

This third embodiment is featured in measuring the temperature of the gas turbine fuel and managing the nature of the gas turbine fuel. The metal concentration in the gas turbine fuel varies depending on the temperature of the contact-reaction unit 1. FIG. 5 shows a variation of the metal concentration, particularly vanadium concentration, in the gas turbine fuel with respect to changes in the temperature of the contact-reaction unit 1.

Because the metal concentration in the gas turbine fuel cannot be measured in real time, it is very effective to estimate the metal concentration in the reformed oil from the temperature of the gas turbine fuel and to regulate the supply of the gas turbine fuel to the gas turbine combustor 60. As seen from FIG. 5, the vanadium concentration in the reformed fuel lowers as the temperature of the contact-reaction unit rises. In particular, when the temperature of the contact-reaction unit rises over 450° C., the vanadium concentration can be reduced down to 0.5 weight % or below. With this embodiment, that relationship between the temperature and the vanadium concentration is measured in advance, and the timing of starting the supply of the reformed oil to the gas turbine is determined by detecting the temperature of the contact-reaction unit 1 and estimating the vanadium concentration in the reformed oil.

According to the present invention, as described above, when modifying heavy oil with high-temperature, high-pressure water, metals can be removed from the heavy oil without needing a catalyst, such as an alkali, whereby fuel suitable for use in gas turbines can be produced.

What is claimed is:

1. A heavy oil treating system comprising:
   a contact-reaction unit, high temperature and high pressure water and heavy oil being supplied to said contact-reaction unit, said contact-reaction unit being arranged so as to flow said high temperature and high pressure water and heavy oil in a vertical direction;
   a nozzle arranged at an upper side of said contact-reaction unit, being parallel to said vertical direction to flow said high pressure water and heavy oil in said contact-reaction unit, supplying heavy oil to said contact-reaction unit downwardly in a direction parallel to said vertical direction;
   supplying means for supplying high temperature and high pressure water or oxidant mixed with high temperature and high pressure water to said contact-reaction unit, being arranged at lower side of said contact-reaction unit; and
   extraction means for extracting a light oil from said contact-reaction unit, being arranged at an upper portion of said contact-reaction unit, an arranged portion of said extraction means being different from an arranged portion of said nozzle.

2. A heavy oil treating system comprising:
   a contact-reaction unit, high temperature and high pressure water and heavy oil being supplied to said contact-reaction unit, said contact-reaction unit being arranged so as to flow said high temperature and high pressure water and heavy oil in a vertical direction;
   a nozzle arranged at an upper side of said contact-reaction unit, being parallel to said vertical direction to flow said high pressure water and heavy oil in said contact-reaction unit, supplying heavy oil to said contact-reaction unit downwardly in a direction parallel to said vertical direction, a top end of said nozzle being arranged at a position lower than an upper side of said contact-reaction unit;

supplying means for supplying high temperature and high pressure water or oxidant mixed with high temperature and high pressure water to said contact-reaction unit, being arranged at lower side of said contact-reaction unit; and extraction means for extracting a light oil from said contact-reaction unit, being arranged at an upper portion of said contact-reaction unit, an arranged portion of said extraction means being different from an arranged portion of said nozzle.

3. A heavy oil treating system comprising:

a contact-reaction unit, high temperature and high pressure water and heavy oil being supplied to said contact-reaction unit, said contact-reaction unit being arranged so as to flow said high temperature and high pressure water and heavy oil in a vertical direction;

a nozzle arranged at an upper side of said contact-reaction unit, being parallel to said vertical direction to flow said high pressure water and heavy oil in said contact-reaction unit, supplying heavy oil to said contact-reaction unit downwardly in a direction parallel to said vertical direction;

supplying means for supplying high temperature and high pressure water or oxidant mixed with high temperature and high pressure water to said contact-reaction unit, being arranged at lower side of said contact-reaction unit;

extraction means for extracting a light oil from said contact-reaction unit, being arranged at an upper portion of said contact-reaction unit, an arranged portion of said extraction means being different from an arranged portion of said nozzle;

a discharging means for discharging heavy oil components containing metals precipitated in a bottom portion of said contact-reaction unit without dissolving in the high temperature and high pressure water; and burning means for burning said heavy oil components discharged from said discharge means.

* * * * *